United States Patent
Goncharov et al.

(10) Patent No.: US 11,881,235 B2
(45) Date of Patent: Jan. 23, 2024

(54) LEADING SHIELD FOR MAGNETIC RECORDING HEADS

(71) Applicant: Western Digital Technologies, Inc., San Jose, CA (US)

(72) Inventors: Alexander Goncharov, Morgan Hill, CA (US); Zhanjie Li, Pleasanton, CA (US); Terence T. Lam, Cupertino, CA (US); Suping Song, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/652,066

(22) Filed: Feb. 22, 2022

(65) Prior Publication Data
US 2023/0267953 A1    Aug. 24, 2023

(51) Int. Cl.
*G11B 5/31*    (2006.01)
*G11B 5/187*   (2006.01)
*G11B 5/127*   (2006.01)

(52) U.S. Cl.
CPC .......... *G11B 5/3116* (2013.01); *G11B 5/1276* (2013.01); *G11B 5/187* (2013.01); *G11B 5/315* (2013.01)

(58) Field of Classification Search
CPC ..... G11B 5/3116; G11B 5/315; G11B 5/1276; G11B 5/187
See application file for complete search history.

(56) References Cited

U.S. PATENT DOCUMENTS

| | | | |
|---|---|---|---|
| 6,437,949 B1 * | 8/2002 | Macken | G11B 5/3113 |
| 8,238,059 B1 | 8/2012 | Tang et al. | |
| 8,243,386 B2 | 8/2012 | Kameda et al. | |
| 8,254,059 B2 * | 8/2012 | Horide | G11B 5/1278 |
| | | | 360/125.03 |
| 8,524,095 B2 | 9/2013 | Hong et al. | |
| 8,542,461 B2 | 9/2013 | Bai et al. | |
| 8,649,124 B2 | 2/2014 | Zou et al. | |
| 8,730,617 B1 | 5/2014 | Hsiao et al. | |

(Continued)

FOREIGN PATENT DOCUMENTS

JP    2012113804 A    6/2012

OTHER PUBLICATIONS

Pan et al. Strong long-range perpendicular exchange bias across a spacer layer, AIP Advances, vol. 9, No. 125046, 2019, 5 pages, https://doi.org/10.1063/1.5128308.

*Primary Examiner* — Brian E Miller
(74) *Attorney, Agent, or Firm* — PATTERSON + SHERIDAN, LLP; Steven H. VerSteeg

(57) ABSTRACT

The present disclosure relates to a magnetic recording head having an exchange biased leading shield or leading edge shield (LES). The LES is a bilayer structure. One or more layers are coupled below the LES such that the LES is disposed between the main pole and the one or more layers. The one or more layers exchange bias the LES such that the upper layer of the LES has a magnetization parallel to the magnetization of the trailing shield. The lower layer of the LES has a magnetization that is antiparallel to the magnetization of the upper layer of the LES. The one or more layers set the preferred direction for the lower layer of the LES and sets the LES as a two-domain state without relying upon the anisotropy field (Hk) of either the upper or lower layers of the LES.

25 Claims, 5 Drawing Sheets

(56) References Cited

U.S. PATENT DOCUMENTS

| | | | |
|---|---|---|---|
| 8,767,347 B1 | 7/2014 | Sasaki et al. | |
| 8,867,169 B2 | 10/2014 | Sasaki et al. | |
| 8,988,823 B1 | 3/2015 | Sasaki et al. | |
| 9,082,433 B1 | 7/2015 | Tang et al. | |
| 9,111,550 B1* | 8/2015 | Liu | G11B 5/11 |
| 9,390,735 B1* | 7/2016 | Wang | G11B 5/398 |
| 9,443,541 B1* | 9/2016 | Liu | G11B 5/315 |
| 9,489,969 B1 | 11/2016 | Ikegawa et al. | |
| 9,805,745 B1* | 10/2017 | Takagishi | G11B 5/3116 |
| 10,014,021 B1* | 7/2018 | Liu | G11B 5/1278 |
| 10,068,601 B1* | 9/2018 | Li | G11B 5/3912 |
| 10,366,714 B1 | 7/2019 | Olson et al. | |
| 10,468,054 B1 | 11/2019 | Shin et al. | |
| 10,490,210 B1 | 11/2019 | Liu et al. | |
| 10,586,558 B1 | 3/2020 | Sasaki et al. | |
| 10,643,640 B1* | 5/2020 | Liu | G11B 5/23 |
| 10,679,650 B2 | 6/2020 | Bai et al. | |
| 10,699,731 B1 | 6/2020 | Wu | |
| 10,916,261 B1 | 2/2021 | Liu | |
| 11,049,513 B1* | 6/2021 | Le | G11B 5/235 |
| 11,264,051 B1 | 3/2022 | Liu | |
| 11,302,350 B1* | 4/2022 | Zhang | G11B 5/11 |
| 11,676,627 B2* | 6/2023 | Lam | G11B 5/315<br>360/244.3 |
| 2005/0157431 A1* | 7/2005 | Hatatani | G11B 5/3903<br>360/328 |
| 2006/0002020 A1* | 1/2006 | Pokhil | G11B 5/3133 |
| 2006/0098334 A1* | 5/2006 | Jayasekara | G11B 5/3116 |
| 2008/0112081 A1 | 5/2008 | Matono | |
| 2009/0147410 A1 | 6/2009 | Jiang et al. | |
| 2011/0075294 A1* | 3/2011 | Fuchizaki | G11B 5/1278 |
| 2012/0075748 A1* | 3/2012 | Kief | G11B 5/1278 |
| 2012/0127612 A1 | 5/2012 | Shin et al. | |
| 2012/0140356 A1* | 6/2012 | Horide | G11B 5/1278<br>360/75 |
| 2012/0236431 A1 | 9/2012 | Hirata et al. | |
| 2013/0329316 A1* | 12/2013 | Watanabe | G11B 5/3146<br>360/78.04 |
| 2014/0268417 A1* | 9/2014 | Singleton | G11B 5/3163<br>360/123.12 |
| 2014/0293474 A1* | 10/2014 | Yamane | G01R 33/098<br>360/234.3 |
| 2018/0144768 A1* | 5/2018 | Liu | G11B 5/1871 |
| 2020/0176021 A1 | 6/2020 | Liu et al. | |
| 2023/0044051 A1* | 2/2023 | Lam | G11B 5/1276 |

* cited by examiner

LEADING SHIELD FOR MAGNETIC RECORDING HEADS

BACKGROUND OF THE DISCLOSURE

Field of the Disclosure

Aspects of the present disclosure generally relate to a magnetic recording head having an exchange biased leading shield.

Description of the Related Art

Over the past few years, various magnetic recording methods have been studied to improve the areal density of a magnetic media device, such as a hard disk drive (HDD). Magnetic recording heads, or, in particular, the write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, some magnetic recording head designs use various shields around a main pole, such as side shields, leading shields, and trailing shields, to make the magnetic recording head sufficiently strong to write data to magnetic media, without disturbing the data that have already been previously written. The more recent energy assisted writers enable passing current between the main pole and the trailing shield, as well as the side-shield and leading shield assembly, to further enhance the writing ability. However, in energy assisted designs, magnetization stability is often compromised due to the modifications needed to accommodate the energy-assistance scheme, such as the insertion of a separation-gap between the trailing-shield/upper-return-pole assembly and side-shield/leading-shield assembly.

Therefore, there is a need in the art for a magnetic recording head having improved shields and enhanced control of magnetic fields.

SUMMARY OF THE DISCLOSURE

The present disclosure relates to a magnetic recording head having an exchange biased leading shield or leading edge shield (LES). The LES is a bilayer structure. One or more layers are coupled below the LES such that the LES is disposed between the main pole and the one or more layers. The one or more layers exchange bias the LES such that the upper layer of the LES has a magnetization parallel to the magnetization of the trailing shield. The lower layer of the LES has a magnetization that is antiparallel to the magnetization of the upper layer of the LES. The one or more layers set the preferred direction for the lower layer of the LES and sets the LES as a two-domain state without relying upon the anisotropy field (Hk) of either the upper or lower layers of the LES.

In one embodiment, a magnetic recording head comprises a leading shield comprising a lower layer and an upper layer disposed on the lower layer; a trailing shield; and a main pole disposed between the leading shield and the trailing shield, wherein the upper layer of the leading shield is disposed adjacent the main pole, wherein a direction of magnetization of the upper layer of the leading shield is parallel to a direction of magnetization of the trailing shield.

In another embodiment, a magnetic recording head comprises: a leading shield comprising a lower layer and an upper layer disposed on the lower layer, wherein the lower layer is exchange biased; a trailing shield; and a main pole disposed between the leading shield and the trailing shield, wherein the upper layer of the leading shield is disposed adjacent the main pole, wherein a direction of magnetization of the lower layer of the leading shield is antiparallel to a direction of magnetization of the trailing shield.

In another embodiment, a magnetic recording head comprises: a leading shield comprising a lower layer and an upper layer disposed on the lower layer; a trailing shield; a main pole disposed between the leading shield and the trailing shield; and means to set a magnetization direction of the upper layer of the leading shield to match a magnetic field initialization (MFI) of the trailing shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to a magnetic recording head having an exchange biased leading shield or leading edge shield (LES). The LES is a bilayer structure. One or more layers are coupled below the LES such that the LES is disposed between the main pole and the one or more layers. The one or more layers exchange bias the LES such that the upper layer of the LES has a magnetization parallel to the magnetization of the trailing shield. The lower layer of the LES has a magnetization that is antiparallel to the magnetization of the upper layer of the LES. The one or more layers set the preferred direction for the lower layer of the LES and sets the LES as a two-domain state without relying upon the anisotropy field (Hk) of either the upper or lower layers of the LES.

It is to be understood that the embodiments discussed herein are applicable to a data storage device such as a hard disk drive (HDD) as well as a tape drive such as a tape embedded drive (TED) or an insertable tape media drive such as those made according to Linear Tape Open (LTO) standards. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 1:
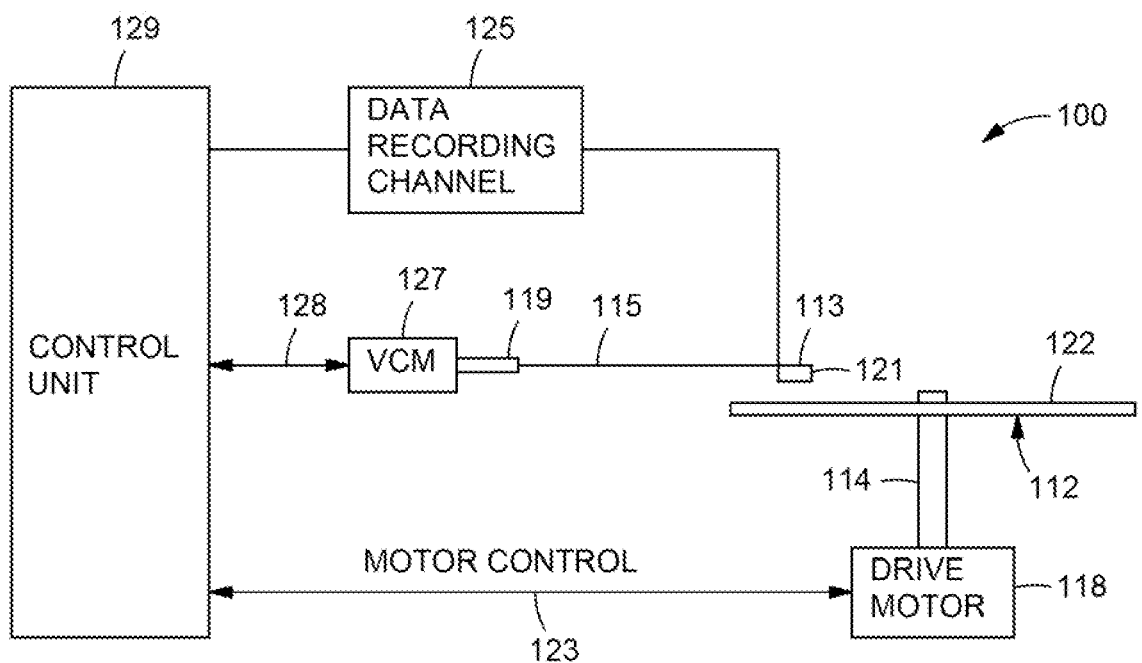
FIG. 1 illustrates a schematic view of a disk drive, according to one implementation.

FIG. 1 illustrates a schematic view of a disk drive (e.g., magnetic recording device) 100, according to one implementation. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the magnetic recording device 100, the rotation of the magnetic media 112 generates an air bearing between the slider 113 and the media surface 122, which exerts an upward force or lift on the slider 113. The air bearing thus counter-balances the slight spring force of suspension 115 and supports the slider 113 off and slightly above the media 112 surface by a small, substantially constant spacing during normal operation. In an energy-assisted magnetic recording (EAMR) head, DC or AC electric-current flows through an assist element of the magnetic head assembly 121 and enhances the write-ability so that the write element of the magnetic head assembly 121 magnetizes the data bits in the media 112. In certain embodiments, the EAMR recording head may achieve the assistive effect via microwave assisted magnetic recording (MAMR) with a write assist element comprising a spin torque oscillator.

The various components of the magnetic recording device 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
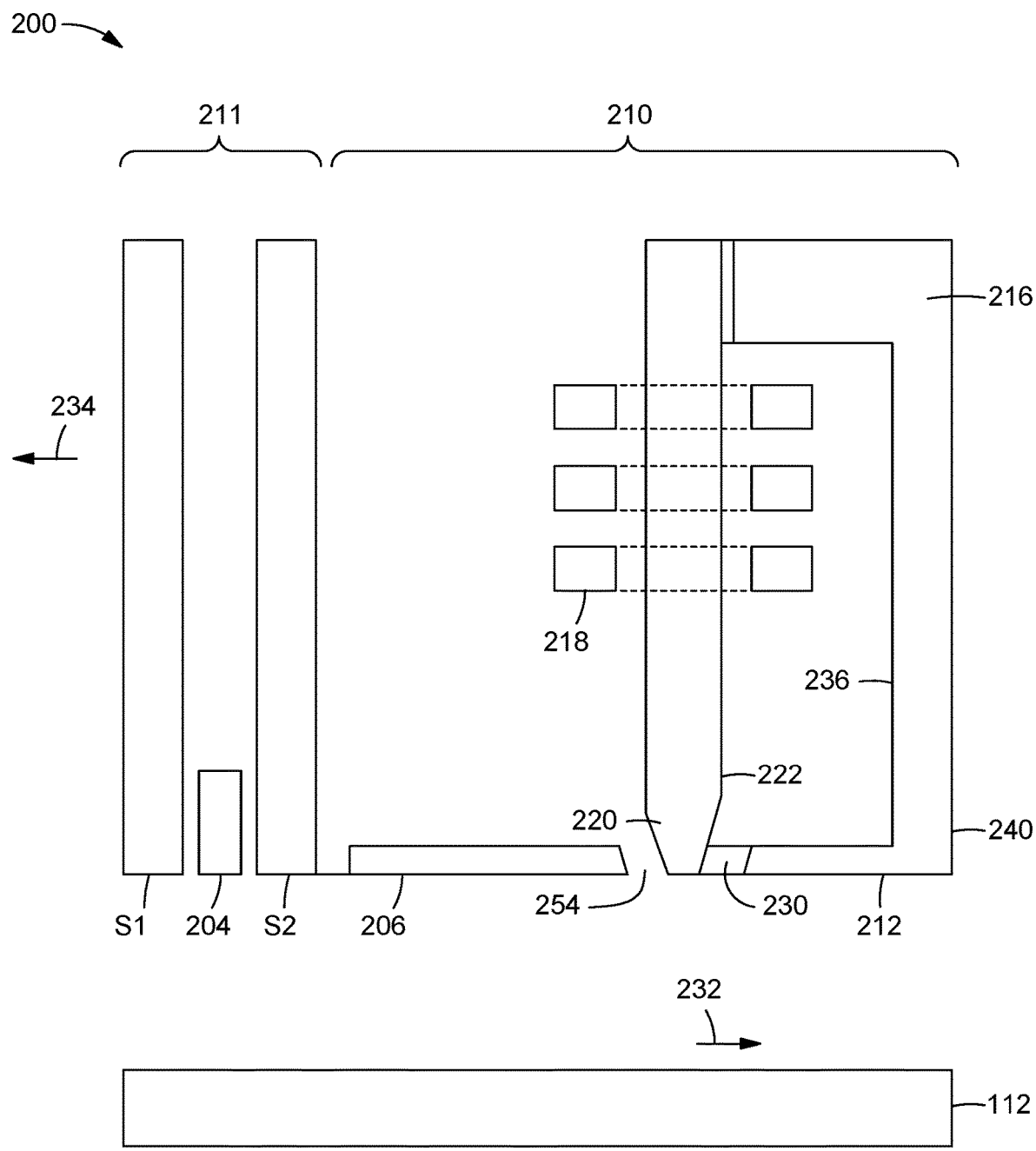
FIG. 2 is a fragmented and schematic cross-sectional side view through a center of a read/write head facing the magnetic media, according to one implementation.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a main pole 220, an upper-return pole coupled to a trailing shield 240, and a coil 218 that excites the main pole 220. The write head 210 also comprises a leading shield 206. The coil 218 may have a "pancake" structure which winds around a back-contact between the main pole 220 and the return pole 216, instead of a "helical" structure shown in FIG. 2. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222, which may be parallel to a leading surface 236 of the trailing shield 240. The main pole 220 may be a tapered write pole (TWP) with a trailing edge taper (TET) configuration. The main pole 220 may comprise ferromagnetic materials, typically alloys of one or more of Co, Fe, and Ni. The read/write head 200 may be an EAMR head that comprises a write assist element 230. The write assist element 230 is disposed between the main pole and at least one of: the trailing shield, the leading shield, the first side shield, and the second side shield. In one embodiment, a write assist element 230 is disposed between the trailing shield 240 and the main pole 220, as shown in FIG.

2, and/or between the leading shield 206 and the main pole 220 (gap 254). During writing, a DC or AC electric-current flows through the assist element to enhance writing performance.

In one embodiment, the write assist element 230 may include a spin torque oscillator (STO). In other embodiments, the write assist element 230 may include a multi-layer structure including magnetic and non-magnetic materials, or a structure including non-magnetic electrically conductive material, each configured to provide assistive effect for the write operation. Examples of such a structure include those described in U.S. Pat. No. 10,366,714, titled "Magnetic write head for providing spin-torque-assisted write field enhancement," to Olson et al. and in U.S. Pat. No. 10,679,650, titled "Current-assisted magnetic recording write head with improved write gap structure" to Bai et al., both of which are assigned to assignee of the current application and hereby incorporated by reference.

Figure 3:
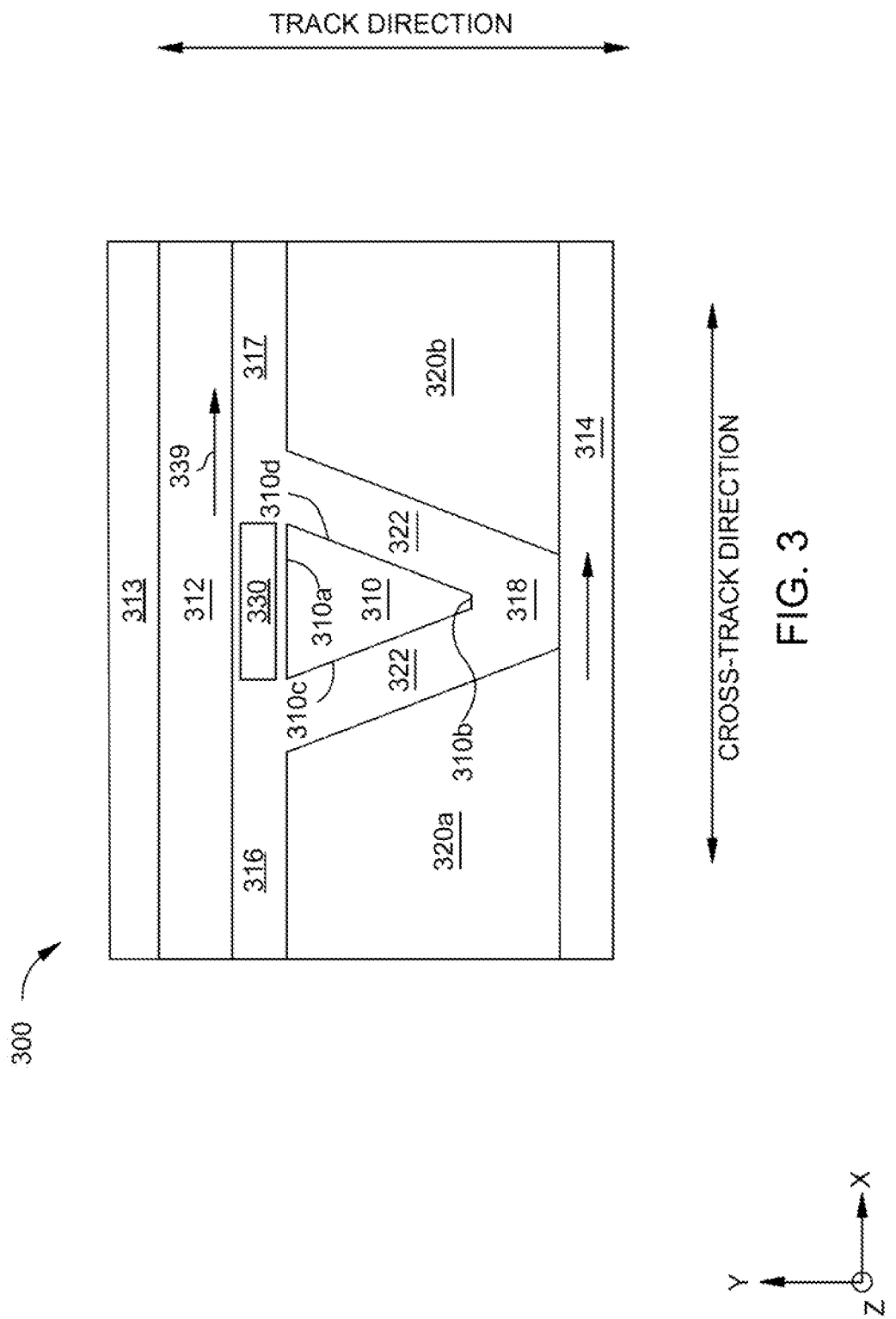
FIG. 3 is a schematic illustration of a media facing surface (MFS) view of a magnetic recording head according to one embodiment.

FIG. 3 illustrates a MFS view of a magnetic recording head 300 according to one embodiment. The magnetic recording head 300 may be the write head 210 of FIG. 2. The magnetic recording head 300 is within a magnetic recording device, such as the magnetic recording device 100 of FIG. 1. The magnetic recording head 300 is an energy assisted perpendicular magnetic recording (E-PMR) head.

The magnetic recording head 300 comprises a main pole 310 disposed between a trailing shield 312 and a leading shield 314 in the track direction. The main pole 310 may comprise a magnetic material such as an alloy of one or more of Co, Fe, Ni (e.g., FeCo, NiFe, or CoFeNi). The trailing shield 312 comprises a magnetic material such as a NiFe alloy. The trailing shield 312 is disposed opposite to a first surface 310a of the main pole 310, and the leading shield 314 is disposed adjacent to a second surface 310b of the main pole 310. The first surface 310a is opposite the second surface 310b. The main pole 310 is further disposed between side shields 320a, 320b in the cross-track direction. The side shields 320a, 320b comprise a material selected from the group consisting of NiFe, NiFeCo, and NiFeRe. The side shields 320a, 320b are disposed adjacent to a third surface 310c and a fourth surface 310d of the main pole 310, where the third surface 310c is opposite the fourth surface 310d. A trailing gap 316 is disposed between the first surface 310a of the main pole 310 and the trailing shield 312, and a leading gap 318 is disposed between the second surface 310b of the main pole 310 and the leading shield 314. Side gaps 322 are disposed between the third and fourth surfaces 310c, 310d of the main pole 310 and the side shields 320a, 320b. The trailing shield 312 is disposed between the trailing gap 316 and an upper return pole 313 and has a direction of magnetization 339. The return pole 313 may comprise a magnetic material such as an alloy of one or more of Co, Fe, Ni (e.g., FeCo, NiFe, or CoFeNi). In some embodiments, a current source (not shown) supplies alternating current (AC) or direct current (DC) to the magnetic recording head 300.

As will be discussed below, the leading shield 314 comprises a multilayer laminate structure having at least a pair of magnetic layers. Each of the magnetic layers is composed of the same material, or different magnetic materials. FIG. 3 further depicts an insulation layer 317 disposed between the side shields 320a, 320b and the trailing shield 312. The insulating layer 317 may comprise aluminum oxide. It has been discovered that the insulation layer 317 enables energy assisted design schemes that pass current through the write assist element 330, for example, as one located in a path between the main pole 310 and the trailing shield 312. In one embodiment, the write assist element 330 is a part of an energy assisted recording head, or a microwave assisted magnetic recording (MAMR) head. In some design schemes, the thickness of the insulation layer 317 is about 5 nm or less or about 50 nm or more, or about 5 nm to about 50 nm, such as about 10 nm to about 30 nm. Without being bound by theory, it is believed that the insulation layer 317 also causes magnetic instability by decoupling the trailing shield and upper return pole assembly from the side shield and leading shield assembly by breaking the magnetic "exchange coupling" between the assemblies and causing magnetic rotation.

EAMR heads can have a complicated structure of the wrap around shield in order to design an effective path of the electric current towards the main pole 310. One of the problems discovered in the recording head design with a disconnected side shield 320a, 320b and trailing shield 312 is a strong asymmetry of the write contour between positive and negative bits. The asymmetry is strongly correlated with the loss of overwrite in such recording heads, leading to a significant loss in areal density capacity (ADC). The origin of the contour asymmetry is related to the shield design with disconnected side shield 320a, 320b and trailing shield 312. The flux return path from the main pole 310 to the upper return pole 313 is affected in such a way that the leading shield 314 plays a role in the flux closure. Both experimental and modeling confirm that the leading shield 314 with a two-domain state has high effective permeability and conducts flux symmetrically for both sides of the side shield 320a, 320b, effectively removing the contour asymmetry.

Figure 4:
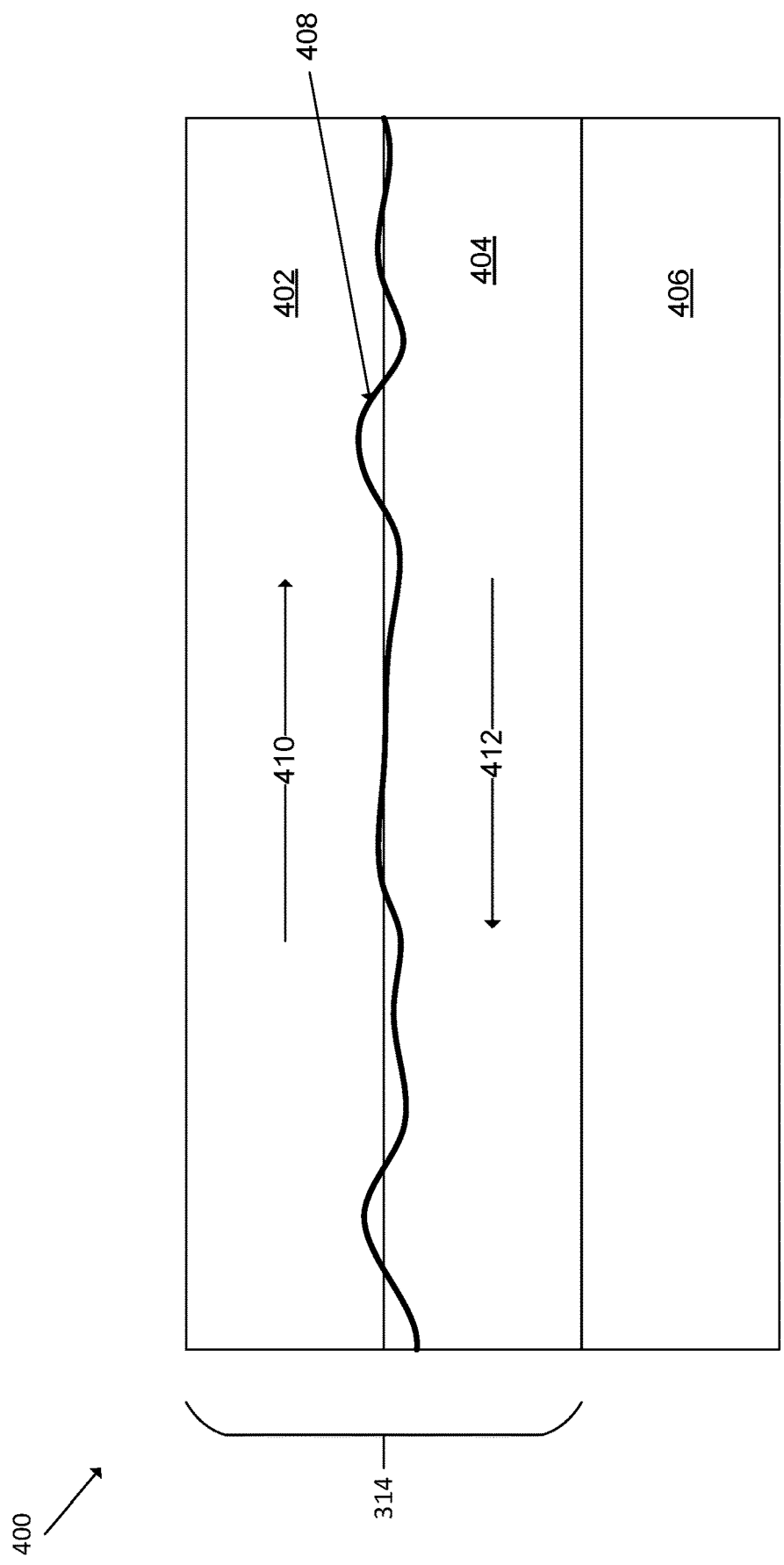
FIG. 4 is a schematic illustration of a leading edge shield structure according to one embodiment.

FIG. 4 is a schematic illustration of a leading edge shield structure 400 according to one embodiment. The structure 400 comprises the leading shield 314 and an exchange biasing structure 406. The leading shield 314 comprises two layers, lower layer 404 and upper layer 402, that comprise soft magnetic material such as NiFe. The leading shield 314 has a throat height of between about 150 microns and about 350 microns that permits the leading shield 314 to conduct magnetic flux efficiently. Each of the lower layer 404 and the upper layer 402 may have a thickness of between about 100 nm to about 1 um. A direction of magnetization 410 of the upper layer 402, which is adjacent to the main pole 310, is parallel to the direction of magnetization 339 in the trailing shield 312. A configuration where the upper layer 402 has a direction of magnetization 410 that is parallel to the direction of magnetization 339 of the trailing shield 312 has a good effective permeability. The magnetization 412 of the lower layer 404 points in the opposite direction of (i.e., antiparallel to) the direction of magnetization 410 for the upper layer 402. The two domains, or more specifically the magnetizations 410, 412 of the upper layer 402 and the lower layer 404, are separated by a domain wall 408.

A uniform (i.e., single layer) leading shield 314 causes asymmetric main pole 310 saturation and asymmetric magnetic core width (MCW). Even if a two layer leading shield 314 is used, a stiff upper layer 402 can still cause MCW asymmetry as well as main pole asymmetric saturation. Generally, the stiffer the upper layer 402, the more main pole asymmetric saturation occurs. For example, a stiff upper layer 402 may have a stress induced anisotropy in the cross-track direction of greater than 20 Oe. MCW asymmetry with a stiff upper layer 402 in the two domain state is smaller than with a uniform leading shield 314. The lower layer 404, regardless of whether stiff or soft, does not impact MCW asymmetry if the upper layer 402 is kept soft. Because a stiff upper layer 402 negatively impacts MCW asymmetry, a soft upper layer 402 is used in the two layer leading shield 314. The soft upper layer 402 will have a stress induced anisotropy in the cross-track direction of up to about 10 Oe. Because the stiffness of the lower layer 404 does not impact MCW asymmetry, the lower layer 404 can be either stiff or soft. The lower layer 404 may have a stress induced anisotropy in the cross-track direction of up to about 100 Oe, such as about 50 Oe. Above 100 Oe, it will be difficult to obtain exchange biasing for the leading shield 314. The stiffness or softness of the lower layer 404 and upper layer 402 is mainly governed by the magneto-elastic anisotropy. Therefore, materials with high magnetostriction constants tend to be more magnetically stiff in the presence of mechanical stress. As such, while the upper layer 402 and lower layer 404 may comprise NiFe for example, the upper layer 402 and lower layer 404 may have different Fe content such as, for example, $Ni_{80}Fe_{20}$ and $Ni_{45}Fe_{55}$, respectively. Therefore, there is value in the two domain state over the uniform (i.e., single layer) leading shield 314. As will be explained below, the two domain state leading shield structures 400, 500 discussed herein have no asymmetry issues.

In order to achieve the leading shield 314 with such a magnetization state, an exchange biasing structure 406 is used to exchange bias the lower layer 404 of the leading shield 314 in some embodiments. The exchange biasing structure 406 is disposed below the lower layer 404 such that the lower layer 404 is disposed on and in contact with the exchange biasing structure 406. The direction of the exchange bias is opposite to the magnetic field initialization (MFI) direction. The strength of the exchange bias is preferably set to be about the same as the domain wall 408 energy density in the leading shield 314, such as less than or equal to 1 erg/cm². The domain wall 408 is nucleated and propagated into the leading shield 314 with the magnetization orientation favorable for the best writer performance.

The exchange bias structure 406, together with the multilayer leading shield 314, results in a leading shield 314 having two domains without relying on a magnetic anisotropy field (Hk) in either the lower layer 404 or the upper layer 402. Based upon MCW sensitivity, the lower layer 404 can be stiffer than the upper layer 402, but the upper layer 402 is preferably set to remain soft. Stated another way, the lower layer 404 can have a higher Hk compared to the upper layer 402. The MCW does not depend upon the Hk of the lower layer 404. However, the Hk of the upper layer 402 Hk impacts the MCW such that a higher Hk for the upper layer 402 leads to a larger MCW. Hence, the lower the Hk of the upper layer 402 (i.e., the softer the upper layer 402), the lower the MCW. Additionally, because the upper layer 402 has a low Hk, is a soft magnetic material, and is adjacent the side shield 320a, 320b, MCW asymmetry can be significantly reduced. By exchange biasing the lower layer 404, any remaining MCW asymmetry is counteracted.

It is to be understood that both the upper layer 402 and the lower layer 404 may comprise soft magnetic material such as NiFe. In one embodiment, the lower layer 404 and the upper layer 402 comprise the same soft magnetic material. It is contemplated that while the upper layer 402 and lower layer 404 may comprise the same soft magnetic material, the stoichiometric compositions of the layers 402, 404 may be different.

As shown in FIG. 4, the exchange bias structure 406 is in direct contact with the lower layer 404. In one embodiment, the exchange bias structure 406 comprises a permanent magnet. In another embodiment, the exchange bias structure 406 comprises an antiferromagnetic (AF) material. The AF material may comprise a single or multiple layers. The permanent magnet or AF material may have a thickness of between about 100 nm to about 500 nm. Suitable materials for the AF material comprise PtMn, NiMn, IrMn, IrMnCr, and combinations thereof. Suitable materials for the permanent magnet include CoPt and CoPtCr.

Figure 5:
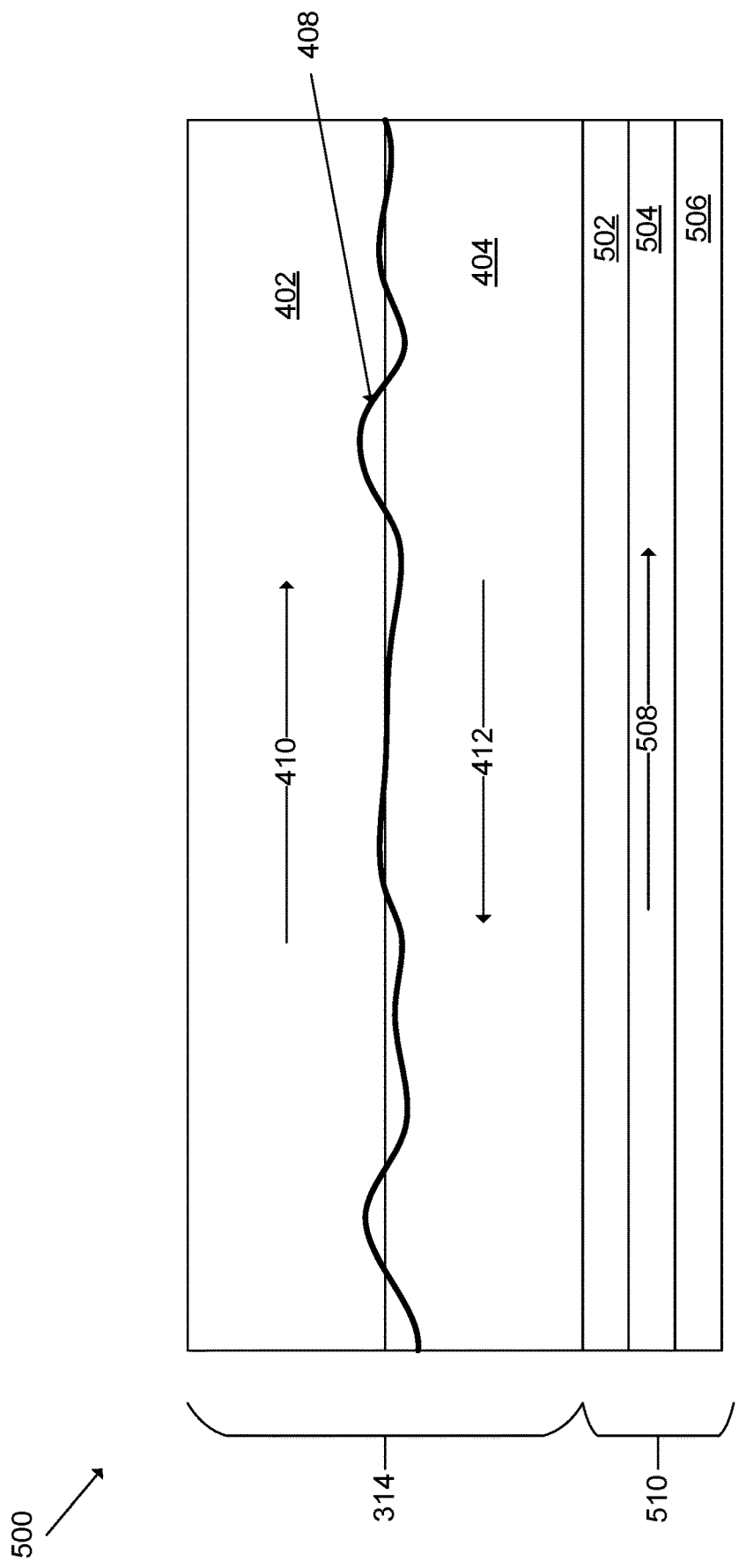
FIG. 5 is a schematic illustration of a leading edge shield structure according to one embodiment.

FIG. 5 is a schematic illustration of a leading edge shield structure 500 according to one embodiment. The exchange bias structure 510 comprises an AF coupling layer 502, oftentimes referred to as a spacer layer, disposed adjacent to the lower layer 404 such that the lower layer 404 is disposed on and in contact with the AF coupling layer 502. The AF coupling layer 502 has a thickness chosen such that the AF Ruderman-Kittel-Kasuya-Yosida (RKKY) coupling is achieved between lower layer 404 and a biasing ferromagnetic layer 504 discussed below. In one embodiment, the AF coupling layer 502 comprises Ru, Cu, Cr, or combinations thereof. The thickness of the AF coupling layer 502 may be between about 0.7 nm and about 1 nm, such as about 0.8 nm.

The exchange bias structure 510 additionally comprises the biasing ferromagnetic layer 504. The biasing ferromagnetic layer 504 is disposed adjacent the AF coupling layer 502 such that the AF coupling layer 502 is disposed on and in contact with the ferromagnetic layer 504. In one embodiment, the biasing ferromagnetic layer 504 has a thickness of between about 50 nm and about 200 nm. As such, the AF coupling layer 502 is sandwiched between the lower layer 404 and the biasing ferromagnetic layer 504. Suitable materials for the biasing ferromagnetic layer 504 comprise alloys of Fe, Co, Ni, and combinations thereof. The biasing ferromagnetic layer 504 has stress induced or magnetocrystalline Hk in the cross-track direction with values exceeding 50 Oe. The biasing ferromagnetic layer 504 has a direction of magnetization 508 that is parallel to the upper layer 402 and antiparallel to the lower layer 404.

The exchange bias structure 510 additionally comprises a non-magnetic layer 506. In one embodiment, the non-magnetic layer 506 comprises AlOx. The non-magnetic layer 506 has high mechanical stress, such as between about 50 MPa and about 500 MPa. The biasing ferromagnetic layer 504 is disposed on in in contact with the non-magnetic layer 506 such that the biasing ferromagnetic layer 504 is sandwiched between the AF coupling layer 502 and the non-magnetic layer 506.

The same goal as present for FIG. 4 is present for FIG. 5, namely injecting a domain wall 408. In the embodiment shown in FIG. 5, the domain wall 408 is achieved using a RKKY coupling structure. The RKKY coupling structure results in (AF) coupling between an auxiliary biasing ferromagnetic layer 504 that is below the lower layer 404. The direction of magnetization 508 in the biasing ferromagnetic layer 504 is set by the MFI and is retained by the high Hk. AF coupling to the lower layer 404 through the AF coupling layer 502 will attempt to rotate the direction of magnetization 412 of the lower layer 404 locally and will inject the domain wall 408 into the leading shield 314. Strong anisotropy in the biasing ferromagnetic layer 504 can be achieved by one or more of: (1) shape anisotropy (i.e., a thin layer of between about 50 nm and about 200 nm will prevent injection of the domain wall 408 in the biasing ferromagnetic layer 504), (2) magneto-elastic anisotropy by depositing the biasing ferromagnetic layer on top of the non-magnetic layer 506 with high stress, such as between about 50 MPa and about 500 MPa, and (3) magneto-crystalline anisotropy.

By utilizing exchange biasing for a multilayer leading shield in magnetic recording heads, such as EAMR heads, contour asymmetry is effectively removed without relying upon Hk in any layer of the multilayer leading shield. The exchange biasing of the multilayer leading shield conducts flux symmetrically for both sides of the side shield. In addition to being useful for EAMR or MAMR heads, leading edge shield structures discussed herein are applicable to any magnetic write head where the trailing shield is disconnected from the side shields.

In one embodiment, a magnetic recording head comprises a leading shield comprising a lower layer and an upper layer disposed on the lower layer, wherein the lower layer is exchange biased; a trailing shield; and a main pole disposed between the leading shield and the trailing shield, wherein the upper layer of the leading shield is disposed adjacent the main pole, wherein a direction of magnetization of the upper layer of the leading shield is parallel to a direction of magnetization of the trailing shield. A direction of magnetization of the lower layer of the leading shield is antiparallel to the direction of magnetization of the upper layer of the leading shield. The lower layer of the leading shield and the upper layer of the leading shield comprise NiFe. The magnetic recording head additionally comprises an exchange biasing structure coupled to the lower layer of the leading shield. The exchange biasing structure comprises an AF layer or permanent magnet. The lower layer of the leading shield is disposed on the exchange biasing layer. The exchange biasing structure comprises a Ruderman-Kittel-Kasuya-Yosida (RKKY) coupling structure. The RKKY coupling structure comprises a spacer layer disposed adjacent the lower layer of the leading shield, a ferromagnetic layer disposed adjacent the spacer layer, and a non-magnetic layer disposed adjacent the ferromagnetic layer. The spacer layer comprises ruthenium. A domain wall is formed between the lower layer of the leading shield and the upper layer of the leading shield, wherein the domain wall has an energy density that is equal to a strength of an exchange bias of the exchange biasing structure. A magnetic recording device comprising the magnetic recording head is also disclosed.

In another embodiment, a magnetic recording head comprises: a leading shield comprising a lower layer and an upper layer disposed on the lower layer; a trailing shield; and a main pole disposed between the leading shield and the trailing shield, wherein the upper layer of the leading shield is disposed adjacent the main pole, wherein a direction of magnetization of the lower layer of the leading shield is antiparallel to a direction of magnetization of the trailing shield. The magnetic recording head additionally comprises an energy assisting element disposed between the main pole and the trailing shield. The magnetic recording head additionally comprises an exchange biasing structure coupled to the lower layer of the leading shield, wherein the exchange biasing structure has a bias that is antiparallel to the direction of magnetization of the trailing shield. The exchange biasing structure is antiferromagnetically coupled to the lower layer of the leading shield. A magnetic recording device comprising the magnetic recording head is also disclosed.

In another embodiment, a magnetic recording head comprises: a leading shield comprising a lower layer and an upper layer disposed on the lower layer; a trailing shield; a main pole disposed between the leading shield and the trailing shield; and means to set a magnetization direction of the upper layer of the leading shield to match a magnetic field initialization (MFI) of the trailing shield. The means to set a magnetization direction comprises a means that is antiferromagnetically coupled to the leading shield. A magnetic recording device comprising the magnetic recording head is also disclosed.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a leading shield comprising a lower layer and an upper layer disposed on the lower layer, wherein both the lower and upper layers are magnetic, wherein the upper layer and the lower layer are in contact with one another;
   a trailing shield; and
   a main pole disposed between the leading shield and the trailing shield, wherein the upper layer of the leading shield is disposed adjacent the main pole, wherein a direction of magnetization of the upper layer of the leading shield is parallel to a direction of magnetization of the trailing shield.

2. The magnetic recording head of claim 1, wherein a direction of magnetization of the lower layer of the leading shield is antiparallel to the direction of magnetization of the upper layer of the leading shield.

3. The magnetic recording head of claim 1, wherein the lower layer of the leading shield and the upper layer of the leading shield comprise NiFe.

4. The magnetic recording head of claim 1, further comprising an exchange biasing structure coupled to the lower layer of the leading shield.

5. The magnetic recording head of claim 4, wherein the exchange biasing structure comprises an antiferromagnetic (AF) layer or a permanent magnet.

6. The magnetic recording head of claim 4, wherein the lower layer of the leading shield is disposed on the exchange biasing layer.

7. The magnetic recording head of claim 4, wherein the exchange biasing structure comprises a Ruderman-Kittel-Kasuya-Yosida (RKKY) coupling structure.

8. The magnetic recording head of claim 7, wherein the RKKY coupling structure comprises a spacer layer disposed adjacent the lower layer of the leading shield, a ferromagnetic layer disposed adjacent the spacer layer, and a non-magnetic layer disposed adjacent the ferromagnetic layer.

9. The magnetic recording head of claim 8, wherein the spacer layer comprises ruthenium.

10. The magnetic recording head of claim 4, wherein a domain wall is formed between the lower layer of the leading shield and the upper layer of the leading shield, wherein the domain wall has an energy density that is equal to a strength of an exchange bias of the exchange biasing structure.

11. The magnetic recording head of claim 1, further comprising a write assist element between the main pole and the trailing shield.

12. The magnetic recording head of claim 11, further comprising:
    a return pole;
    a plurality of side shields; and
    an insulating layer separated the plurality of side shields from at least one of the trailing shield and the return pole.

13. The magnetic recording head of claim 1, wherein the upper layer is magnetically softer than the lower layer.

14. A magnetic recording device comprising:
    a magnetic recording head, comprising:
       a leading shield comprising a lower layer and an upper layer disposed on the lower layer, wherein both the lower and upper layers are magnetic, and wherein the upper layer and the lower layer are in contact with one another;

a trailing shield; and a main pole disposed between the leading shield and the trailing shield, wherein the upper layer of the leading shield is disposed adjacent the main pole, wherein a direction of magnetization of the upper layer of the leading shield is parallel to a direction of magnetization of the trailing shield.

15. A magnetic recording head, comprising:

a leading shield comprising a lower layer and an upper layer disposed on the lower layer, the lower layer and the upper layer both being magnetic, wherein the upper layer and the lower layer are in contact with one another;

a trailing shield; and a main pole disposed between the leading shield and the trailing shield, wherein the upper layer of the leading shield is disposed adjacent the main pole, wherein a direction of magnetization of the lower layer of the leading shield is antiparallel to a direction of magnetization of the trailing shield.

16. The magnetic recording head of claim 15, further comprising an energy assisting element disposed between the main pole and the trailing shield.

17. The magnetic recording head of claim 16, further comprising:

a return pole;

a plurality of side shields; and an insulating layer separated the plurality of side shields from at least one of the trailing shield and the return pole.

18. The magnetic recording head of claim 15, further comprising an exchange biasing structure coupled to the lower layer of the leading shield, wherein the exchange biasing structure has a bias that is antiparallel to the direction of magnetization of the trailing shield.

19. The magnetic recording head of claim 18, wherein the exchange biasing structure is antiferromagnetically coupled to the lower layer of the leading shield.

20. A magnetic recording device comprising:

a magnetic recording head, comprising:

a leading shield comprising a lower layer and an upper layer disposed on the lower layer, the lower layer and the upper layer both being magnetic, and wherein the upper layer and the lower layer are in contact with one another;

a trailing shield; and a main pole disposed between the leading shield and the trailing shield, wherein the upper layer of the leading shield is disposed adjacent the main pole, wherein a direction of magnetization of the lower layer of the leading shield is antiparallel to a direction of magnetization of the trailing shield.

21. A magnetic recording head, comprising:

a leading shield comprising a lower layer and an upper layer disposed on the lower layer, both the lower layer and the upper layer being magnetic, wherein the upper layer and the lower layer are in contact with one another;

a trailing shield;

a main pole disposed between the leading shield and the trailing shield; and a means to set a magnetization direction of the upper layer of the leading shield to match a magnetic field initialization (MFI) of the trailing shield.

22. The magnetic recording head of claim 21, wherein the means to set a magnetization direction comprises a means that is antiferromagnetically coupled to the lower layer of the leading shield.

23. The magnetic recording head of claim 21, further comprising a write assist element between the main pole and the trailing shield.

24. The magnetic recording head of claim 23, further comprising:

a return pole;

a plurality of side shields; and an insulating layer separated the plurality of side shields from at least one of the trailing shield and the return pole.

25. A magnetic recording device comprising:

a magnetic recording head, comprising:

a leading shield comprising a lower layer and an upper layer disposed on the lower layer, both the lower layer and the upper layer being magnetic, and wherein the upper layer and the lower layer are in contact with one another;

a trailing shield;

a main pole disposed between the leading shield and the trailing shield; and a means to set a magnetization direction of the upper layer of the leading shield to match a magnetic field initialization (MFI) of the trailing shield.

* * * * *